United States Patent [19]
Yaeger et al.

[11] Patent Number: 5,805,730
[45] Date of Patent: Sep. 8, 1998

[54] METHOD FOR TRAINING AN ADAPTIVE STATISTICAL CLASSIFIER WITH IMPROVED LEARNING OF DIFFICULT SAMPLES

[75] Inventors: Larry S. Yaeger, Los Gatos; Richard F. Lyon, Los Altos, both of Calif.

[73] Assignee: Apple Computer, Inc., Cupertino, Calif.

[21] Appl. No.: 512,296

[22] Filed: Aug. 8, 1995

[51] Int. Cl.[6] .............................. G06K 9/62; G06K 9/74; G06K 9/00; G06K 9/72

[52] U.S. Cl. ..................... 382/228; 382/187; 382/229; 382/225; 382/157

[58] Field of Search ........................ 382/182, 185–188, 382/215, 220, 225, 227, 228–229, 224, 155–157, 159–161, 137; 364/276.6, 972.7; 395/21, 23, 761, 792

[56] References Cited

U.S. PATENT DOCUMENTS

| | | | |
|---|---|---|---|
| 5,161,204 | 11/1992 | Hutcheson et al. | 382/157 |
| 5,204,914 | 4/1993 | Mason et al. | 382/161 |
| 5,337,371 | 8/1994 | Sato et al. | 382/224 |
| 5,392,363 | 2/1995 | Fujisaki et al. | 382/187 |
| 5,555,317 | 9/1996 | Anderson | 382/159 |
| 5,577,166 | 11/1996 | Mizuno | 382/159 |

*Primary Examiner*—Bipin Shalwala
*Attorney, Agent, or Firm*—Burns, Doane, Swecker & Mathis, L.L.P.

[57] ABSTRACT

A statistical classifier that can be used for pattern recognition is trained to recognize negative, or improper patterns as well as proper patterns that are positively associated with desired output classes. A set of training samples includes both the negative and positive patterns, and target output values for the negative patterns are set so that no recognized class is indicated. The negative patterns are selected for training with less frequency than the positive patterns, and their effect on training is also modified, so that training is focused more heavily on improper patterns.

5 Claims, 2 Drawing Sheets

| PATTERN | TYPE | PROB. OF USAGE CORRECT/INCORRECT | | ERROR FACTOR LABEL CLASS/OTHER | |
|---|---|---|---|---|---|
| cl | POSITIVE | 0.5 | 1.0 | 1.0 | 0.1 |
| o | POSITIVE | 0.5 | 1.0 | 1.0 | 0.1 |
| g | POSITIVE | 0.5 | 1.0 | 1.0 | 0.1 |
| c | NEGATIVE | 0.18 | | 0.3 | |
| c\|o | NEGATIVE | 0.18 | | 0.3 | |
| l | NEGATIVE | 0.18 | | 0.3 | |
| \|o | NEGATIVE | 0.18 | | 0.3 | |
| og | NEGATIVE | 0.18 | | 0.3 | |

| PATTERN | TYPE | PROB. OF USAGE CORRECT/INCORRECT | | ERROR FACTOR LABEL CLASS/OTHER | |
|---|---|---|---|---|---|
| d | POSITIVE | 0.5 | 1.0 | 1.0 | 0.1 |
| o | POSITIVE | 0.5 | 1.0 | 1.0 | 0.1 |
| g | POSITIVE | 0.5 | 1.0 | 1.0 | 0.1 |
| c | NEGATIVE | 0.18 | | 0.3 | |
| clo | NEGATIVE | 0.18 | | 0.3 | |
| l | NEGATIVE | 0.18 | | 0.3 | |
| lo | NEGATIVE | 0.18 | | 0.3 | |
| og | NEGATIVE | 0.18 | | 0.3 | |

| PHASE | EPOCHS | LEARNING RATE | CORRECT TRAIN PROB | NEGATIVE TRAIN PROB |
|---|---|---|---|---|
| 1 | 25 | 1.0 - 0.5 | 0.1 | 0.05 |
| 2 | 25 | 0.5 - 0.1 | 0.25 | 0.1 |
| 3 | 50 | 0.1 - 0.01 | 0.5 | 0.18 |
| 4 | 30 | 0.01 - 0.001 | 1.0 | 0.3 |
*Fig. 4*
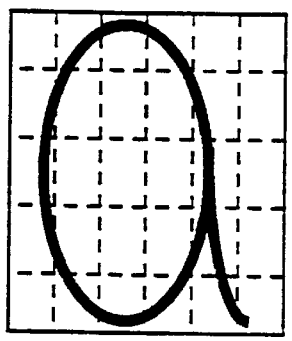 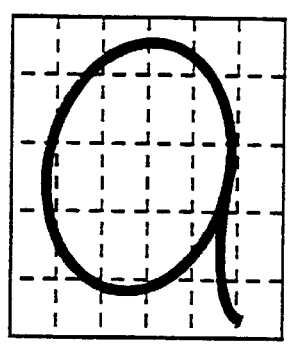 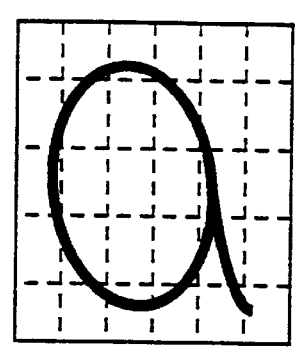
*Fig. 5A*  *Fig. 5B*  *Fig. 5C*
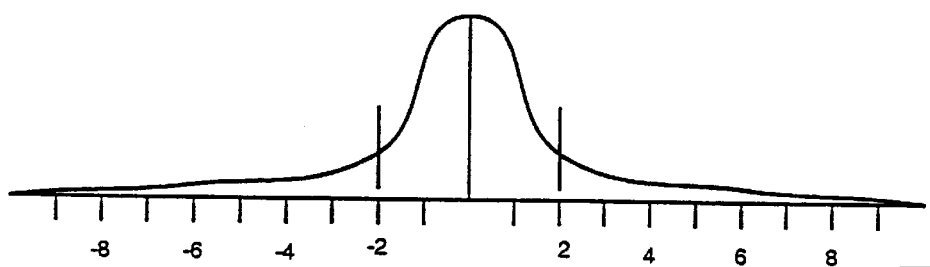
*Fig. 6*
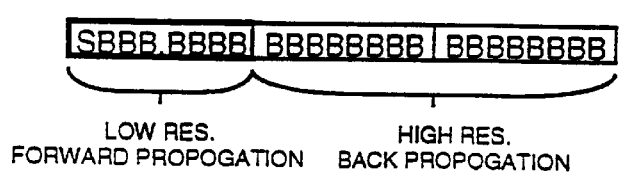
*Fig. 7*

METHOD FOR TRAINING AN ADAPTIVE STATISTICAL CLASSIFIER WITH IMPROVED LEARNING OF DIFFICULT SAMPLES

FIELD OF THE INVENTION

The present invention is directed to adaptive classifiers of the type that are capable of being trained, such as neural networks, and more particularly to procedures for training such devices, particularly for use in handwriting recognition systems and other recognition systems.

BACKGROUND OF THE INVENTION

When statistical classifiers are used for pattern recognition, it is generally desirable to employ an adaptive type of classifier, rather than a programmed classifier, in those situations where input samples which belong to the same class can have an unknown variance between them. One example of such a situation is the field of handwriting recognition. While alphanumeric characters each have well defined shapes, the manner in which individuals write those characters can vary widely among different persons. Even the same person can write characters differently at various times. A classifier that is programmed to recognize particular patterns, such as the letters of an alphabet, may not be able to accommodate the nuances introduced by the handwriting of different individuals. Conversely, a classifier which has trainable properties, for example a neural network, can be taught to recognize that different variations of the same character belong in the same class. For this reason, adaptive statistical classifiers are used for applications such as speech recognition, handwriting recognition and optical character recognition.

The present invention is directed to the manner in which adaptive statistical classifiers, such as neural networks, are trained to recognize input patterns such as those representative of handwriting or speech. Generally, in the training of a classifier, a number of training samples are individually provided as input data to the classifier, and a target output is designated for each input sample. Each time a training sample is input, the classifier produces an output vector. This output vector is compared with the target output, and the differences between the two represent an error. This error is then employed to train the classifier. For example, in a neural network, the value of the error can be back-propagated through each of the layers of the network, and used to adjust weights assigned to paths through which the data propagates in the operation of the classifier. By repeating this process a number of times, the weights are adjusted in a manner which causes the outputs of the classifier to converge toward the target value for a given input sample.

It can be appreciated that the training procedure has a significant impact on the resulting ability of the classifier to successfully classify applied input patterns. Typically, a classifier is trained to classify each input sample into one or a few output classes which have the highest probabilities of being the correct class. While a conventional classifier may provide good results for output classes having a probability near 0.5 or greater, it typically does not provide a good estimate when there is a low probability that a given input sample belongs to a particular class. Rather, it tends to estimate the probability of such classes as zero. However, this type of behavior may not be desirable in all cases. For example, in handwriting recognition, a vertical stroke might typically represent the lowercase letter "l", the capital letter "I", or the numeral "1". However, there is also the possibility that the vertical stroke might represent an exaggerated punctuation mark, such as a comma or apostrophe. If outcomes which have a very low probability are forced towards zero, the classifier might not indicate that there is a possibility that a vertical stroke represents a comma or an apostrophe. As a result, this possibility is not taken into account during subsequent word recognition. Accordingly, it is one objective of the present invention to provide a technique for training a classifier in a manner which provides a more reliable estimate of outputs having low probabilities.

Typically, a statistical classifier attempts to place every input sample into one or more of the recognized output classes. In some instances, however, a particular input sample does not belong to any output class. For example, in a handwriting recognition environment, a particular stroke may constitute one portion of a character, but be meaningless by itself. If, however, the stroke is separated from the rest of the character, for example by a small space, the classifier may attempt to classify the stroke as a separate character, giving an erroneous output. Accordingly, it is another objective of the present invention to train a statistical classifier in a manner which facilitates recognition of input samples which do not belong to any of the output classes, and thereby avoid erroneous attempts by the classifier to place every possible input sample into a designated output class.

In a typical training session for a classifier, every input sample in a set of samples might be employed the same number of times to train the classifier. However, some input samples have greater value, in terms of their effect on training the classifier, than others. For example, if the classifier correctly recognizes a particular input sample, there is no need to repeatedly provide that sample to the classifier in further training iterations. Conversely, if an input sample is not correctly classified, it is desirable to repeat the training on that sample, to provide the classifier with a greater opportunity to learn its correct classification. It is a further objective of the present invention to provide an efficient training procedure, in which the probability that different input samples are provided to the classifier is adjusted in a manner which is commensurate with their value in the training of the classifier.

In a typical application, it is unlikely that all possible classes will occur with the same frequency during run-time operation of the classifier. For example, in the English language, the letter "Q" is used infrequently, relative to most other letters of the alphabet. If, during the training of the classifier, the letter Q appears significantly less often in training samples than other letters, the classifier may exhibit an improper bias against that letter, e.g., it may have a much lower probability than the letter "O" for a circular input pattern. In the past, efforts have been made to compensate for this bias by adjusting the output values produced by the classifier. See, for example, R. P. Lippmann, "Neural Networks, Bayesian A Posteriori Probabilities, and Pattern Classification," appearing in *From Statistics to Neural Networks—Theory and Pattern Recognition Applications,* V. Cherkassky, J. H. Friedman and H. Wechsler, Springer-Verlag, Berlin, 1994, pages 83–104; and N. Morgan and H. Bourlard, "Continuous Speech Recognition—An Introduction to the Hybrid HMM/Connectionist Approach," *IEEE Signal Processing,* Vol. 13, No. 3, pages 24–42, May 1995. Rather than consuming run-time resources to compensate output values, as was done in the past, it is preferable to eliminate the bias against rare classes through appropriate training of the classifier. Accordingly, it is another objective of the present invention to train a classifier in a manner which accounts for unequal frequencies of classes among input samples in a training set, and thereby factor out any tendency for bias against low frequency classes.

In training a classifier, it is a common problem that the classifier will become "overfitted" to the training data, and will not exhibit good generalization to novel samples encountered in actual use. A prior art method to improve generalization is to augment the set of training samples with modified copies of the training samples, to help the classifier learn to generalize across a class of modifications. This approach, discussed by Chang and Lippmann, "Using Voice Transformations to Create Additional Training Talkers for Word Spotting", *Advances in Neural Information Processing Systems* 7, 1995, requires a large increase in the size of the training set actually handled by the training process, resulting in a significant slow-down and a large memory requirement. Accordingly, it is another object of the present invention to train a classifier in a manner which avoids overfitting and helps generalization across a range of modifications or distortions, without a large increase in training cost in terms of compute time or memory.

In a classifier that is based upon neural networks, the output values that are generated in response to a given input sample are determined by the weights of the paths along which the input data propagates, i.e., the interconnections between the nodes in successive layers of the network. Previous large-scale studies have concluded that performance of a neural network in a recognition task degrades seriously for weights having a resolution smaller than about 15 bits or two bytes. See Asanovic and Morgan, "Experimental Determination of Precision Requirements for Back Propagation Training of Artificial Neural Networks", *Tech Report of the International Computer Science Institute*, Berkeley, Calif., 1991. Depending upon the complexity of the network, there may be hundreds or even thousands of interconnections between the various nodes. Since a weight must be stored for each such interconnection, it can be appreciated that a significant amount of storage capacity is required for the weight information that defines a neural network's function. It is a further objective of the present invention to provide a neural network which can successfully operate with weights defined by smaller values, e.g., one byte each, and thereby reduce the memory requirements for the run-time operation of the network.

SUMMARY OF THE INVENTION

In accordance with the present invention, the first objective noted above is achieved by reducing back-propagated errors for classifier outputs that correspond to incorrect classes, relative to those for correct classes. The effect of such an approach is to raise the output values from the classifier, since the training procedure does not push the outputs for incorrect classifications towards zero as much as conventional training processes do. As a result, the classifier does a better job of estimating probabilities of classifications when they are low, in addition to probabilities in the range of 0.5 and greater.

The second objective identified above is accomplished through a negative training procedure. In this procedure, patterns which do not belong in any of the output classifications are employed as training inputs to the classifier, in addition to correct patterns. A target output value of zero for all classes is employed for these "incorrect" patterns. As a result, the overall ability of the classifier to recognize related groups of input patterns, for example words in a handwriting recognition environment, is significantly improved.

As a further feature of the invention, negative training samples have a different probability of being employed in a given training session than correct samples. With this approach, the training time is made more efficient, and the classifier has less tendency to suppress outputs for certain inputs that comprise legitimate members of a class by themselves as well as being portions of a larger pattern. In addition, the error value which is back-propagated through the classifier in response to a negative training sample can be scaled differently than for a positive sample, to trade off the need to push output values towards zero for negative input samples against the need to not overly suppress output values for characters that may resemble negative samples.

As a further extension of this concept, another of the objectives identified above is accomplished by providing every training sample with a probability for its use in any given training iteration. For example, in a handwriting recognition application, when a character is correctly classified, there is little advantage to be gained by further training on that character. Rather, it may be preferable to skip the sample to save time, and to prevent overtraining or committing the classifier's power to non-discriminative features. Therefore, correctly classified samples are given a lower probability of use than those which are incorrectly classified. Further in this regard, the probability of use of an input sample can be varied over the training session. Specifically, at the beginning of a training session, correctly classified samples are given a low probability of being trained upon, so that the training resources are focused primarily towards training on errors. However, as training continues, the probability of utilizing a correctly classified sample is increased, to avoid biasing the classifier towards peculiarities in the input samples.

As a further feature of the invention, another of the objectives identified above is accomplished through the balancing of the frequencies of training samples. For a given set of training samples, a repetition factor is calculated for each output class, which indicates the average number of times an input pattern should be repeated each time a pattern from the class is selected for training. Thereafter, input samples are randomly selected and can be either skipped or repeated, depending on their repetition factors. With this approach, samples which belong to more frequent classes are less likely to be used as training inputs than those which belong to rarer classes.

As another feature of the present invention, overfitting is prevented and generalization is improved by applying random distortions from a predetermined family of distortions to training samples as they are selected during the training process, so that repeated selection of samples over time does not result in training the classifier on identical data patterns. In particular, samples that are repeated for balancing, as mentioned above, are given different random distortions on each repetition.

As another feature of the present invention, the memory requirements of a classifier can be reduced by limiting the range and resolution of the weights which define links between individual nodes of a neural network. In the forward propagation of an input sample through the network during training, low resolution weight values, e.g., one byte each, are employed. During error back-propagation, weight changes are accumulated in high resolution values that are formed by concatenating an extra one or two bytes with the low resolution weight values. If the weight change results in a carry across the boundary between the low resolution and higher resolution bytes, the low resolution weight is varied. After training is completed, only the low resolution weight values need to be stored for the actual operation of the classifier, thereby reducing memory requirements for final products.

These and other features of the invention, as well as the advantages provided thereby, are explained in detail hereinafter with reference to preferred embodiments of the invention illustrated in the accompanying figures.

BRIEF DESCRIPTION OF THE DRAWINGS

FIG. 4 is a table illustrating the parameters of a four-phase training session;

FIGS. 5A–5C are examples of random distortions of training patterns;

FIG. 6 is a histogram of weights for an exemplary neural network; and

FIG. 7 is a block diagram representation of bits in a weight value.

DETAILED DESCRIPTION

Figures 1, 2, 3:
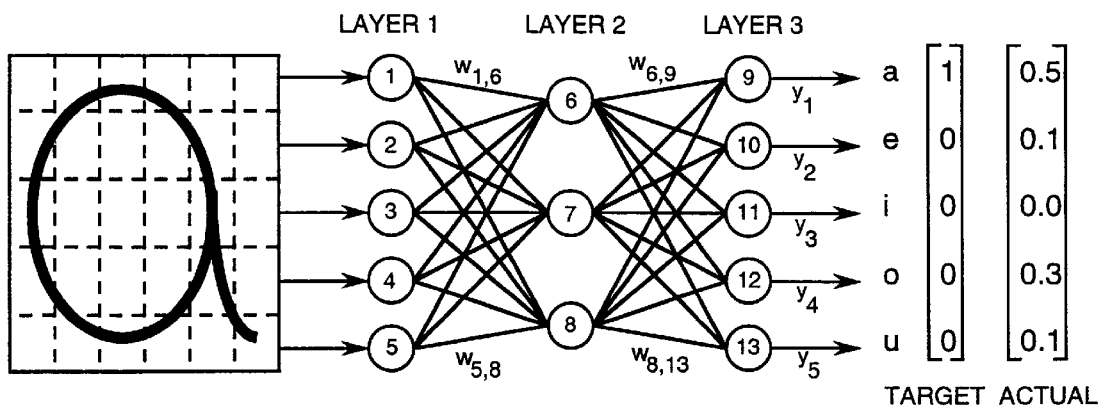
FIG. 1 is a schematic diagram of an exemplary neural network that is utilized for handwriting recognition.
FIG. 2 is an illustration of an exemplary handwriting sample.
FIG. 3 is a table of positive and negative input patterns for training.

The present invention is generally directed to adaptive statistical classifiers that are employed to recognize input information from a variety of sources. Typical applications of such classifiers are in the fields of speech recognition, handwriting recognition, and optical character recognition. In general, neural networks, which are inherently trainable devices, have been employed in these types of applications. Accordingly, the principles of the present invention are described hereinafter with reference to their implementation in a neural network. Furthermore, to facilitate an understanding of the invention, an exemplary neural network is described in the context of its application to a word recognition device that is applicable to both on-line handwriting and printed optical character recognition. It will be appreciated, however, that the practical applications of the principles which underlie the present invention are not limited to this particular example. Rather, they are generally applicable to the training of a statistical classifier for use in any suitable environment.

While the structure of a neural network does not form part of the present invention itself, an exemplary neural network is described hereinafter to facilitate an understanding of the principles which underlie the invention. Referring to FIG. 1, a neural network which might be used for handwriting recognition is illustrated. This particular network is a three-layered back-propagation network, in which the nodes of each layer are fully interconnected. In the illustrated embodiment, an input layer, Layer 1, comprises five nodes 1–5 which respectively receive input values relating to a handwritten character. For example, the input values may relate to an image of the character on an input grid, as illustrated in FIG. 1. Alternatively, the input values could relate to features of the handwritten character, such as stroke features as drawn by the user. In a preferred implementation of the invention, multiple representations of a character, such as a combination of its image and stroke features, are employed as input parameters. For further information in this regard, reference is made to copending, commonly assigned application Ser. No. 08/512,860, filed Aug. 8, 1995.

The values received at the respective input nodes of Layer 1 are provided to each of the three nodes 6–8 in Layer 2, also known as a "hidden layer." Each connection between a node of Layer 1 and a node of Layer 2 is defined by a corresponding weight, $w_{ij}$, where i refers to a node in the first layer and j represents a node in the second layer. In FIG. 1, the link between the first node of Layer 1 and the first node of Layer 2 has as associated weight $w_{16}$, and the link between the fifth node of Layer 1 and third node of Layer 2 has a weight $w_{58}$. Each of the other links between the nodes of the two layers also have associated weights, which are not identified in FIG. 1, for clarity. The input value which is provided to a node in Layer 2 is equal to the value at a node of Layer 1 multiplied by the weight of the corresponding link. In addition to these inputs from other nodes, a constant "bias weight" input can also be provided to each node. Within each node, all of the input values are summed, and the result is "squashed" through a sigmoid function or other nonlinearity, to produce an output value, or activation value.

In a similar manner, the activation values from the respective nodes of Layer 2 are multiplied by corresponding weights, $w_{jk}$, and provided to the node of an output layer, Layer 3. In each of the nodes 9–13 of Layer 3, all of the input values, including a bias weight, are summed and squashed, to produce an output value $y_k$. Each of the nodes in the output layer corresponds to one of the classes into which input samples are classified. In the example of FIG. 1, there are five classes, which respectively correspond to the vowels a, e, i, o and u. The output value $y_k$ that is produced at each of the nodes of Layer 3 represents the probability that a given input sample belongs to the associated class.

It will be appreciated, of course, that the embodiment of the neural network shown in FIG. 1 is a simple example, for illustration purposes. In practice, the number of nodes in each layer is likely to be much greater, to accommodate an appropriate number of input parameters and output classes. Further in this regard, the number of hidden layers can be more than 1, as is well-known.

In the training of a neural network, an input sample is provided, and a target value is set for each of the output nodes. For neural networks used as classifiers, target values are determined from labels that indicate a particular class that each training sample is thought to be a member of; in practice, the vast majority of labels will be correct, though some errors may be tolerated or even inevitable depending on the problem domain. In the example of FIG. 1, the input sample is labelled as the letter "a", and the target values $y_k$ are equal to "1" for the class corresponding to the character "a", and "0" for each of the other classes. It will be appreciated, of course, that values other than 0 and 1 can be used as the target values, as long as they function to readily distinguish correct classes from incorrect classes. For purposes of the following discussion, target values of 1 and 0 will be employed for this purpose.

When the input sample is applied to the network, the actual output values may be as shown in the right column of FIG. 1. In particular, the network estimates that the probability that the input sample belongs to class "a" is 0.5, class "o" is 0.3, etc. The differences between the target values and the actual values represent errors, which are back-propagated through the network to adjust the weight values of each of the links, and thereby train the network to better recognize the input sample.

For each of the nodes in output Layer 3, the weights are adjusted according to the formula:

$$w \leftarrow w - \epsilon_o \frac{\partial E_i}{\partial w} \quad (1)$$

where: w represents the weight of a link into the node,
$E_0$ is an overall learning rate factor, and
$E_i$ is the error at output node i.

Since the nodes in the hidden layer are each connected to a number of output nodes in the output layer, there are multiple errors to be factored into the weight changes for the input links to these nodes. Therefore, the formula for adjusting the weights to the input links for each node in the hidden layer is as follows:

$$w \leftarrow w - \epsilon_o \sum_i E_i \frac{\partial E_i}{\partial w} \quad (2)$$

where $E_i$ is the error associated with each output node i which the node of interest in the hidden layer can influence.

The weight update equation (1) for weights leading into the output layer can be written the same as equation (2) for generality; it is simper only because most of the partial derivatives are zero.

Computing the partial derivatives in equation (2) is not easy in general, as they depend nonlinearly on activation values at hidden nodes. Fortunately, the well-known error back-propagation procedure, and related training procedures, remove the need for such partial derivative calculations by making each weight update depend only on local error values at each node, which are computed from weights and errors at the next succeeding layer.

The effect of adjusting the weights in this manner is to cause the outputs of the neural network to converge to a minimum mean-squared error (MMSE) estimate of the probability for a certain class $c_i$ given an input x, which is abbreviated as $p(c_i|x)$. In essence, this procedure functions to push the estimate for classes whose probability is low, e.g., less than 0.1, towards a value of 0. While this result may be desirable for certain types of input patterns, such as unique characters, it may be less desirable for patterns which could belong to a number of different classes. For example, as discussed previously, a vertical stroke typically might represent the lower case letter "l", the upper case letter "I", or the numeral "1". Depending upon the context, the stroke could also represent a punctuation mark, for example a comma or an apostrophe. While the probability that the stroke represents a punctuation mark may be lower than that for alphanumeric characters, it is nevertheless real and of interest. Therefore, the neural network should indicate that there is a non-zero probability for the classes pertaining to certain punctuation marks, given an input pattern of that type. However, if the neural network is trained in the normal manner, as described above, the probability for punctuation marks may be pushed too far towards a value of 0.

In accordance with one aspect of the present invention, the error for classifier outputs which correspond to incorrect classes is reduced, relative to that for correct classes, i.e., the label class, to thereby provide a better estimate of classes with low probabilities. Equation 2 can be rewritten as follows:

$$w \leftarrow w - \epsilon_o \left[ E_c \frac{\partial E_c}{\partial w} + \sum_n^{n \neq c} E_n \frac{\partial E_n}{\partial w} \right] \quad (3)$$

where $E_n$ is the error associated with all output classes that are incorrect, i.e., which have a target value of 0, and $E_c$ is the error associated with the correct class, whose target value is 1. Pursuant to the invention, the error for classifier outputs corresponding to incorrect classes is reduced by a factor $\alpha$ which is a user-settable parameter of the training process. Using this approach, the weight update formula can be adjusted as follows:

$$w \leftarrow w - \epsilon_o \left[ E_c \frac{\partial E_c}{\partial w} + \alpha \sum_n^{n \neq c} E_n \frac{\partial E_n}{\partial w} \right] \quad (4)$$

where $0 < \alpha < 1$.

Operationally, this formula is accomplished by the usual error back-propagation procedure, or other error-driven training procedure, by simply multiplying the errors at the output by $\alpha$, rather than involving $\alpha$ at every weight update. That is, the errors are replaced by modified errors, which are then used within any standard error-based training process. In such a case, equation (4) becomes like equation (2), with a substitution of the modified error quantity $E_i'(E_c \text{ and } \alpha E_n)$ but no change in the implicitly calculated derivatives:

$$w \leftarrow w - \epsilon_o \sum_i E_i' \frac{\partial E_i}{\partial w} \quad (5)$$

Alternatively, rather than scale down the errors corresponding to incorrect classes by $\alpha$, the error corresponding to the correct class can be scaled up by a factor $\beta$, where $\beta > 1$. More generally, both factors can be employed to change the relative weights of errors for correct and incorrect classes, where $0 < \alpha < \beta$. For definiteness of the discussion to follow, only the factor $\alpha$ is used, as in equation (4).

The effect of this error modification is to generally raise the output values $y_k$ of the neural network, since the training pushes incorrect responses towards 0 with less force than correct responses are pushed toward a value of 1. The outputs of the network are raised such that they no longer converge to an MMSE estimate of $p(c_i|x)$. Rather, they converge to an MMSE estimate of a non-linear function $f(p(c_i|x,\alpha))$. The non-linearity of this function depends on the factor $\alpha$ by which the error pressure towards 0 is reduced. As a result, the network does a better job of estimating the probability of a class when it is low. This resulting non-linearity can be expressed as:

$$y = \frac{p}{\alpha - \alpha p + p} \quad (6)$$

Typical values for a are in the range 0.02 to 0.2 in the preferred embodiment. Also in the preferred embodiment, the value of $\alpha$ is computed by means of a formula designed to scale the effect of $\alpha$ according to the number of classes N, as a function of a user-settable parameter g.

$$\alpha = \frac{1}{g \cdot (N-1)} \quad (7)$$

With this formula, the setting $g=1/(N-1)$ corresponds to the prior art situation, i.e. no modification or $\alpha=1$, and $g=1$ corresponds to a complete normalization of pressures toward 0 and 1, in the sense that N−1 outputs are pushed toward 0 with a force $\alpha=1/(N-1)$ times the force with which one output is pushed to 1. Useful g values are found to be 0.1 to 0.5, in a handwriting recognition application with N of 80 to 100, but could be even greater than 1 in an application with very few classes.

For any value of $\alpha$ that is less than 1, the effective training rate of the classifier is lowered by a corresponding amount, since the impact of negative errors is attenuated. Accordingly, it may be desirable to increase the training rate factor $\epsilon_0$, to compensate for this reduction in the effective training rate.

In applications such as printed handwriting recognition, different groupings of strokes must be evaluated to determine whether they form a recognizable character. Most arbitrary groupings of individual strokes are likely to be incorrect. If a classifier is only trained to classify correct groupings, it has a tendency to classify every grouping, including those which are incorrect, as having a probability of being in some class, which can result in the expenditure of unnecessary effort to identify words which include incorrectly grouped strokes. As a feature of the present invention, a multi-class classification network can be made to operate more efficiently by training it with patterns that do not belong in any class, but which may be encountered during operation.

FIG. 2 illustrates a handwriting example that a word classifier may receive. In this particular example, the user has written the word "dog", but has left a space between the two strokes which form the letter "d". In evaluating this input pattern, the neural network examines different groups of strokes to determine whether they represent meaningful information. Groups of strokes are sometimes referred to as segments, and the problem of identifying groups that correspond to actual characters is known as the segmentation problem. Recognition systems often integrate the segmentation and classification problems by considering a large number of different segments, many of which are incorrect, and searching for a best overall interpretation that corresponds to one compatible subset of the segments considered. In prior art systems using statistical classifiers such as neural networks, however, the training of the classifier has ignored the incorrect or negative segments. Thus, during training, the network is taught that the first two strokes together represent a recognizable letter, i.e., "d". In accordance with the present invention, the network is also trained to recognize that other groups of strokes are meaningless.

FIG. 3 illustrates a table of various strokes that might be encountered during a handwriting recognition operation, and the resulting training parameters for the classifier. The first three sets of strokes represent positive classifier outputs, namely the letters "d", "o" and "g". The target outputs for each of these patterns has a value of 1 in one of the output classes, which is referred to as the label class. The remaining groups of strokes in FIG. 3 have no label class, but may be encountered during operation of the classifier in a word-recognition process. The neural network is trained with these various patterns of strokes as "negative" samples. More particularly, when a negative sample is provided to the classifier, it is given a target value of 0 for all output classes. With this approach, the neural network learns to recognize each of these patterns as not belonging in any class.

The set of all negative samples is potentially unbounded, and therefore could consume a lot of time if a substantial amount of training effort is employed. Furthermore, if all negative samples are employed to the same extent as positive samples, there is a possibility that certain characters whose strokes also form components of other characters, such as the letters "l" and "o", would be suppressed too greatly. Therefore, it is preferable to employ a probability factor that limits the frequency with which negative samples are utilized during training. During the training of a classifier, sample input patterns are selected at random from a set containing both negative and positive samples. In the preferred embodiment, the probability that a positive sample will be utilized, if selected, can be 1.0 (or it can depend on whether the sample is correctly classified), whereas the probability for negative samples can be in the range of 0.05–0.5, e.g. 0.18, as shown in FIG. 3. Each time a sample is selected, a random number between 0 and 1 can be generated. If the random number is less than the probability factor for a sample, that sample is used, whereas if the random number is greater, the sample is skipped. With this approach, negative training of the classifier is employed, without giving it too much emphasis.

In addition to varying the probability of usage between negative and positive samples, i.e. whether they are selected as training input patterns, a negative training factor can be employed in connection with back-propagated errors to determine the effect that a selected sample will have on the adjustment of the network's weights. In this approach, the modified error in equation (5) can have a different modification for negative training samples than for positive samples. In the preferred embodiment, errors for negative samples are scaled down by a factor of 0.1 to 0.5, relative to the correct-class error for positive samples. Back-propagation training then proceeds normally. Thus, in the table of FIG. 3, the error factor for positive training samples is 1.0, i.e. they are given full effect, whereas that for negative samples is 0.3. With this approach, the outputs of the network can be pushed toward 0 more or less forcefully, depending also on $\alpha$, for negative samples than for incorrect outputs on positive samples, but less forcefully than the amount that they are pushed towards 1 for the correct class of positive samples.

As an additional feature of the present invention, when a positive example is selected for training, the classifier is first run to see whether the classifier already correctly classifies the sample into the label class; i.e., to see whether the output activation value for the label class is higher than all other output activation values. If it is, then training on that particular sample may be less useful than training on samples that are not already correctly classified, so the sample is probabilistically skipped; i.e., it is used with some predetermined probability preferably less than 1, while an incorrectly classified sample is used with probability 1.

In the final columns of the table of FIG. 3, the modification factor $\alpha$ of 0.1 is shown for classes other than the label class for positive samples as discussed above, and the factor 0.3 is shown for negative samples, whereas the factor 1.0 is shown for the label class of positive samples. The distinction between the label class and other classes used in error modification, as shown in the table, is different from the distinction between correct and incorrect classification of positive samples which leads to different probabilities of usage, as shown in the intermediate columns. More particularly, the probability of usage determines whether a given training sample will be applied to the neural network. If a sample is selected for input, the error factor determines how much effect the error values generated by that sample will have on the adjustment of the network's weight values.

In the preferred implementation, the probabilities for the selection of different training samples are varied over time, in different training phases, to improve the behavior of the classifier for both normal and extreme input patterns. FIG. 4 illustrates one example of a four-phase training procedure. To train an adaptive classifier, a set of training samples is generated. For example, in the field of handwriting recognition, the set of training samples might comprise each letter of the alphabet, both lowercase and uppercase, all numerals, and punctuation marks. As described previously, the training set can also include negative training samples, i.e., handwritten strokes or groups of strokes that might be encountered but which, by themselves, do not belong to any of the output classes. The samples in a set are presented to the classifier a number of times during the training procedure. Each iteration of the training process is identified as an "epoch." During an epoch, each sample in the set can be sequentially presented to the classifier, along with its associated target output. More preferably, a number of samples are randomly selected from the set during an epoch, and individually applied to the network.

The second column of the table in FIG. 4 indicates the approximate number of epochs that are employed in each phase. The next column of the table indicates the learning rate, $\epsilon_0$, that is utilized in the adjustment of the weights, for example in accordance with Equation 4. The actual duration of each phase, in the preferred embodiment, is controlled by the learning rate, which is gradually reduced according to some schedule. The fourth column of the table indicates the probability that a sample which is correctly classified in the forward evaluation of the network is then employed in the error back-propagation learning process. As the outset, this value is low, e.g. 0.1, so that during the early phases, the training process concentrates primarily on errors. During subsequent phases, the probability of training on a correctly classified sample increases, while the learning rate decreases, to avoid biasing the outputs in different directions for confusing and non-confusing input patterns. The final column of FIG. 4 indicates the probability that negative training samples are employed. Again, this probability starts out low for the early phases, so that the training process is predominantly focused on errors, and increases for subsequent phases to reduce the likelihood that incorrect groupings of strokes will be forced into one of the recognized output classes, as discussed previously. The usage probabilities illustrated in the table of FIG. 3 correspond to phase 3 of the table in FIG. 4.

As can be seen from the example of FIG. 4, a number of epochs are employed in the training of the classifier. Since a finite set of samples is employed in each epoch, after a considerable number of iterations the classifier begins to learn the peculiarities of the input set. For example, if a person writes a character with a particular swirl or flourish on a given stroke, the classifier will begin to associate that feature with the character. During training, the classifier might become too focused upon this particular feature, which is a condition known as "overfitting." This result is not useful in those situations where the classifier must be generalized for real-world data, in which not all individuals write the character with that same distinguishing feature. To avoid the overfitting problem, in the preferred implementation of the present invention, the individual samples of the training set undergo random distortion from one training pattern presentation to the next. Examples of different types of distortion are shown in FIGS. 5A–5C. Thus, during one presentation the aspect ratio of the characters might be slightly varied, as shown in FIG. 5A. In other presentations, the characters can be rotated as shown in FIG. 5B, or skewed as shown in FIG. 5C. Other minor distortions can also be employed. In a preferred embodiment, combinations of all of the different distortion types are applied to the original pattern data, with randomly chosen amounts of each type of distortion.

The effect of the random distortion is to remove peculiarities that the classifier might otherwise settle upon during the training process. In the past, training pattern sets have been expanded by adding additional distorted samples to the set of training samples that were originally available for such purpose. With this prior approach, only a very few distortions of each original sample are used, since the training set size, the training time, and the storage space increase proportionately. In the present invention, since the original training set is employed, with modifications dynamically computed each time an input sample is selected, there is no adverse impact on the number of patterns per epoch, the training time per epoch, or the pattern storage space required.

Random distortions may be applied directly to the data representing the input pattern to the classifier. Alternatively, in the preferred embodiment, random distortions are applied in the domain of the original training sample, which might be different from the pattern input to the classifier itself. For example, in on-line handwriting recognition, the original sample is a sequence of x and y coordinates from a pen input device, and a "patternizer" step may be employed to change representations, e.g., to convert these coordinates to an image or other pattern for input to the classifier. In that case, distortions are applied as mappings of x and y coordinates to modified coordinates. In the application of optical character recognition, the original sample is an image of a character, and distortions are applied as image modifications. In this case, besides geometric distortions as illustrated in FIG. 5, it would also be appropriate to distort image parameters such as brightness and contrast. In other applications, distortions designed to correspond to expected variations in the input domain should be used.

For handwriting recognition, the training samples might be generated by having a number of individuals write various words which contain entries in each output class. Typically, some letters will occur with much greater frequency than others. For example, in the English language, the vowels appear in words much more often than rare consonants such as "q" and "x". As a result, the set of training samples will contain many more instances of the frequently used characters than the rarer characters. If all samples in the training set have an equal probability of being selected, the training of the network will result in a natural bias towards the more frequently employed characters. In particular, the classifier will become a good estimator of $p(c_i|x)$, which is proportional to $p(c_i)p(x|c_i)$, where $p(c_i)$ is the "unigram" prior probability, or relative frequency, of class $c_i$, and $p(c_i|x)$ is the probability density function at x for patterns in class $c_i$. In order for the classification probabilities to be useful in subsequent, higher level word recognition, this $p(c_i)$ bias should be attenuated, since higher-level search techniques generally need a good estimate of $p(x|c_i)$ to combine with more sophisticated models of prior probabilities in context. In the past, such attenuation was essentially accomplished by dividing the probability estimates for each class by the relative frequency of each class. This approach is not easily accomplished, however, because it requires a reliable estimate of the frequency of each class. Furthermore, for classes which are quite rare, and therefore have a low frequency of appearance, the resulting estimate of the probability that a given input resides in the class can be greater than 1. As a result, the estimates for classes having a low probability may not be reliable.

In the preferred implementation of the present invention, the unbalance in the number of training samples for each class is factored out during the training process, rather than at run time. In general, the frequencies of the training samples are equalized. This is carried out by counting the number of training samples that are in each class, and computing for each class a repetition factor which indicates the average number of times a pattern should be repeated each time that a pattern from the class is randomly selected.

As a first step, the relative frequency of a class is computed as:

$$F_i = \frac{S_i}{S_e/N} \quad (8)$$

where $S_i$ is the number of input samples in class i, N is the number of classes, and $S_e$ is the total number of input samples in all classes. $S_e/N$ is therefore the average number of samples in a class, and $F_i$ is the is the frequency of class i relative to that average.

From this value a repetition factor is computed as:

$$R_i = \left[\frac{f}{F_i}\right]^p \quad (9)$$

The fractional part of the repetition factor $R_i$ is treated as a probability of using the sample once more; e.g., $R_i$ of 2.3 means use a sample from class i two times, and then use it once more with probability 0.3.

The factor f is a balance fraction which determines the relative rates at which samples are skipped and repeated when they are randomly selected from the training set. For example, for f=0.5, samples in classes with a relative frequency $F_i$ equal to 0.5 times the average frequency will be neither skipped nor repeated. Samples in more frequent classes will be probabilistically skipped, and samples in less frequent classes will be probabilistically repeated.

The exponent p is a balance power which determines the extent to which sample frequencies are normalized to one another. For p=0, $R_i$ is 1 for all classes, which is equivalent to the prior art approach of not balancing. For p=1, the training set is fully balanced, i.e., class frequencies used in training are equalized. It may be undesirable to employ a fully balanced approach if the training set includes some classes which are quite rare. In such a situation, either some samples would be repeated very many times, or other samples would be skipped most of the time. Accordingly, it is preferable to employ a value for p which is less than 1, and thereby permit the network to maintain some bias in favor of classes with higher frequency. In the preferred implementation of the invention, the value for p is between 0.5 and 0.9. Other formulas and approaches that serve to equalize or partially equalize class frequencies during training could be devised with similar effect.

As described previously, each link between a node on one layer of the neural network and a node on an adjacent layer has an associated weight. All of the weights together define the function of the network. It can be appreciated that, for a network having a substantial number of inputs and outputs, a number of weight values must be stored. For each layer in a fully connected network, other than input Layer 1, the number of weights to be stored is equal to the number of inputs times the number of outputs. Conventionally, it has been thought that a minimum resolution of 15 bits is necessary for each weight value, to provide acceptable performance of the network. As such, a significant amount of storage in random access memory and/or read only memory is required for the weights which define the network's function. In the implementation of the present invention, the amount of memory required to store weight values can be reduced, by employing different resolutions for the weight values when data is propagated in forward and reverse directions.

FIG. 6 illustrates a histogram of the weight values that might be employed in a typical neural network that is used for handwriting recognition. As can be seen, most of the weights fall within a range of plus and minus 2. In practice, it is possible to limit all weights to this range and achieve satisfactory performance. However, it has been found that improved performance can be achieved if the weights are permitted to occupy a slightly larger range, e.g., about plus or minus 8. By limiting the range of weight values, every value can be expressed with a certain resolution in a predetermined number of bits. For example, 8 bits having the format SBBB.BBBB can be used to express all weights within a range of ±7.9375 with a resolution of 1/16. In this format, the first bit is a sign bit, the next three bits represent an integer value, and the last four bits indicate the fractional value.

In the implementation of the invention, a low-resolution weight value, e.g. 8 bits, is employed when data is propagated through the neural network in the forward direction, i.e. to produce an output in response to an input sample. An example of such a low resolution weight value is shown in FIG. 7. These weight values might be stored in a first memory, or section of a memory. During the training process, after the errors have been calculated a higher resolution weight value is employed to adjust the weights. Referring to FIG. 7, this high resolution weight value is formed by concatenating an extra one or two bytes to the original low resolution weight value. These higher precision values can be stored in a second memory, or a different portion of the memory in which the low resolution weights are stored. When the weight value is adjusted, for example in accordance with Equation 4, the lower resolution byte is changed only if the amount of adjustment is sufficient to cause a carry across the boundary between the low resolution byte and the high resolution bytes. In all instances, however, the resulting weight value is clamped within the predetermined limit range, e.g. approximately plus and minus 8.

In the preferred embodiment, each node of a classifier neural network also has a bias weight value, effectively connected to a constant node, that is trained by the same error back-propagation algorithm as the other weights. In order to allow optimum performance, it is preferable to allow the bias weights to have a larger value range than the other weights. Since there is only one bias weight per node, and many other weights per node, the additional cost of an extra high-order byte for each bias weight is not significant. Alternatively, each node could be provided with a plurality of bias weights in the more limited range, rather than one bias weight in the expanded range.

A number of advantages are achieved by determining the weights in this manner. Specifically, the amount of memory space that is required by the network, once training has been completed, is significantly reduced. The memory which was used to store the high-resolution weight values can be freed for other uses. Furthermore, the forward operation of the network is faster, since memory loads and multiplication operations based on a single byte operand are much faster than those based on multi-byte operands. These advantages are particularly important in an apparatus designed for low cost, portable, memory constrained, or battery-powered operation, in which efficient forward operation is needed, for example for real-time recognition of handwriting, and in which it is also desirable to have a training mode to tune the operation of the classifier for a particular user. In such a system, a training mode can be given access to a significantly larger part of the total random-access storage system, and to a larger percentage of the total computing capability and power budget, for temporary use during training, than the normal forward operation mode is given. After training is completed, the storage used for the high-precision part of the weights is available for use by other functions of the apparatus.

In an alternative embodiment, a neural network can be trained to high precision using a conventional back-propagation training algorithm with floating-point or fixed-point weight values, in both forward and reverse propagation, and then the weight values can be reduced, preferably with rounding, to low-precision weights that occupy only one byte each. In this approach, the one-byte weights are suitable to be deployed in a low-cost, memory-constrained, portable, battery-operated product that does not require a further training process.

From the foregoing, it can be seen that the present invention incorporates a number of features which increase the overall efficiency and accuracy of an adaptive statistical classifier. It will be appreciated by those of ordinary skill in the art that the present invention can be embodied in other specific forms without departing from the spirit or essential characteristics thereof. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A method for training a statistical classifier to estimate the probability that an input pattern is associated with a predetermined class, comprising the steps of:

defining a set of training patterns, each of which is labeled as belonging to a respective one of a plurality of predetermined classes;

assigning a probability of usage factor to said training patterns from said set for input to the classifier;

selecting individual training patterns;

selectively processing the selected training patterns in the classifier, or skipping the selected patterns, in accordance with said probability of usage factor which is based upon whether the samples have been properly classified previously;

detecting whether the classifier produces an output value which correctly identifies the class to which a processed pattern belongs; and modifying the probability of usage factor for correctly identified patterns to be different from a probability of usage factor assigned to incorrectly identified patterns.

2. The method of claim 1 wherein the probability of usage factor assigned to correctly identified patterns is less than the probability of usage factor assigned to incorrectly identified patterns.

3. The method of claim 1 further including the steps of repeatedly processing training samples in the classifier over multiple successive iterations, and increasing the probability of usage factor for later iterations.

4. A method for training a statistical classifier to estimate the probability that an input pattern is associated with a predetermined class, comprising the steps of:

defining a set of training patterns, which are respectively associated with predetermined classes;

assigning a probability factor to said training patterns;

selecting individual training patterns from said set for input to the classifier;

for each selected pattern, selectively processing the selected training pattern in the classifier, in accordance with said probability factor which is based upon whether the sample have been properly classified previously;

detecting whether the classifier produces an output value which correctly identifies a class with which a processed pattern is associated; and decreasing the probability factor for correctly identified patterns, relative to a probability factor assigned to incorrectly identified patterns.

5. The method of claim 4 further including the steps of repeatedly processing training samples in the classifier over multiple successive iterations, and increasing the probability factor for correctly identified patterns in later iterations.

* * * * *